(12) United States Patent
Vidal Fortia et al.

(10) Patent No.: US 9,883,081 B2
(45) Date of Patent: Jan. 30, 2018

(54) SYNCHRONIZED LOOK-UP TABLE LOADING

(71) Applicant: HEWLETT-PACKARD DEVELOPMENT COMPANY, L.P., Houston, TX (US)

(72) Inventors: Joan Vidal Fortia, Barcelona (ES); Ivan Perez Laka, Barcelona (ES); Fernando Viciano Martin, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/312,332

(22) PCT Filed: May 30, 2014

(86) PCT No.: PCT/US2014/040222
§ 371 (c)(1),
(2) Date: Nov. 18, 2016

(87) PCT Pub. No.: WO2015/183305
PCT Pub. Date: Dec. 3, 2015

(65) Prior Publication Data
US 2017/0085754 A1 Mar. 23, 2017

(51) Int. Cl.
*B41J 29/393* (2006.01)
*H04N 1/60* (2006.01)
(Continued)

(52) U.S. Cl.
CPC .............. *H04N 1/605* (2013.01); *B41J 29/38* (2013.01); *B41J 29/393* (2013.01);
(Continued)

(58) Field of Classification Search
CPC ...... B41J 29/38; B41J 13/0009; B41J 29/393; H04N 1/605; H04N 1/00; H04N 1/6019;
(Continued)

(56) References Cited

U.S. PATENT DOCUMENTS 5,309,246 A   5/1994   Barry et al.
6,219,153 B1  4/2001   Kawanabe et al.
(Continued)

OTHER PUBLICATIONS

Bala, et al Two-Dimensional Transforms for Device Color Correction and Calibration. IEEE Transactions on image Processing. vol. 14 No. 8 Aug. 2005.

*Primary Examiner* — Thinh H Nguyen
(74) *Attorney, Agent, or Firm* — HP Inc. Patent Department

(57) ABSTRACT

Examples relate to providing synchronized look-up table loading. In some examples, a print job is processed using an initial look-up table in processor memory, in response to the processing of the print job reaching a buffer trigger row of a portion of the print job, look-up metadata is accessed to locate a next look-up table. At this stage, the next look-up table is dynamically loaded into the processor memory as the processor continues to process the print job, where the processing of the print job begins using the next look-up table after a target row of the portion of the print job is reached.

12 Claims, 3 Drawing Sheets

(51) Int. Cl.
  *B41J 29/38*  (2006.01)
  *G06K 15/10*  (2006.01)
  *H04N 1/00*   (2006.01)
  *G06K 15/02*  (2006.01)

(52) U.S. Cl.
  CPC ....... *G06K 15/102* (2013.01); *G06K 15/1817* (2013.01); *H04N 1/00* (2013.01); *H04N 1/6019* (2013.01); *H04N 1/6058* (2013.01); *G06K 2215/0017* (2013.01); *G06K 2215/0094* (2013.01); *G06K 2215/101* (2013.01)

(58) Field of Classification Search
  CPC ............... H04N 1/6058; G06K 15/102; G06K 15/1817; G06K 2215/0017; G06K 2215/0094; G06K 2215/101
  See application file for complete search history.

(56) References Cited

U.S. PATENT DOCUMENTS

| | | |
|---|---|---|
| 6,731,406 B1 | 5/2004 | Ganapatihy et al. |
| 6,870,637 B1 | 3/2005 | Watanabe |
| 7,061,644 B2 | 6/2006 | Lapstun et al. |
| 8,573,731 B2 | 11/2013 | Bastani et al. |
| 2003/0137695 A1 | 7/2003 | Nomizu |
| 2004/0067085 A1 | 4/2004 | Uemura |
| 2007/0019016 A1* | 1/2007 | Silverbrook ......... G06K 15/102 347/13 |
| 2010/0271417 A1 | 10/2010 | Rimai et al. |

* cited by examiner

SYNCHRONIZED LOOK-UP TABLE LOADING

BACKGROUND

Some printers include image processing application-specific integrated circuits (ASIC) or field-programmable arrays (FPGA) along with software for controlling the printers. Inkjet printheads may show an important variability in the size of the drops ejected. In order to avoid defects on paper, this difference is measured and compensated for by the printer by using a look-up table that lowers or increases the contone level depending on the drop size being too big or too small. A page-wide array printer may have several printheads in order to cover the full media width. In this case, the look-up table used to compensate the drop size has to be updated numerous times while processing a page.

BRIEF DESCRIPTION OF THE DRAWINGS

The following detailed description references the drawings, wherein.

DETAILED DESCRIPTION

As detailed above, look-up tables are used by inkjet printers to compensate for variation in drop size. Look-up tables can also be used for other purposes such as cross color replacement (i.e., color conversion look-up tables to replace missing drops from defective or disabled printhead nozzles). Typically, firmware manually loads look-up tables when each look-up table is to be used for the print job. Images are broken into rows (i.e., bands) and processed in a print pipeline, and after each row, there is a possibility that the look-up table should be changed by the firmware. Firmware loading the look-up tables as needed is suitable for low performance printers, but as the printer performance increases, the processing power required to control the pipeline might become excessive. All the look-up tables may be locally stored in the ASIC or FPGA, which knows when each table should be used. This also provides a high performance with no firmware intervention, but because the local storage in the ASIC or FPGA is expensive, there is a limit in the number of look-up tables that can be used or the cost becomes excessive.

Examples disclosed herein address these issues by storing the look-up tables for processing a print job in external memory that it is large and inexpensive, so there is no limitation in the total number of look-up tables supported. In this case, the loader engine in the ASIC or FPGA can use the look-up tables stored in external memory to perform synchronized look-up table loading for print jobs. Specifically, the loader engine is preconfigured with row triggers that automatically initiate the pre-loading of look-up tables as a portion of the print job is printed. By having the loader engine pre-load the tables, the processor of the printing device can continuously process a print job without interrupting the process to load or wait for the next look-up table to be loaded.

Figure 1:
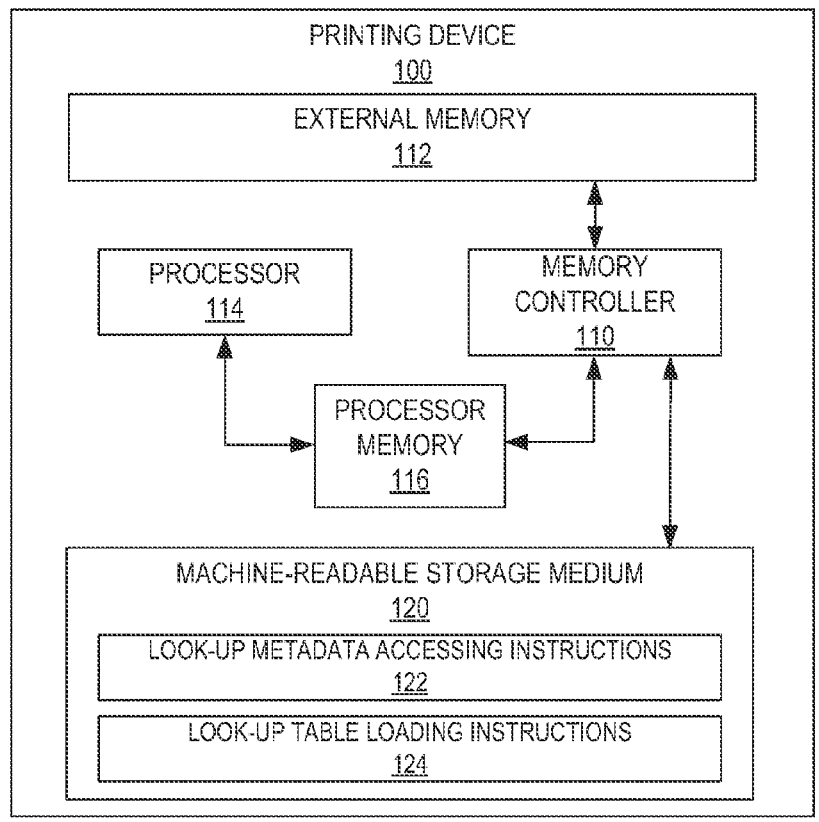
FIG. 1 is a block diagram of an example printing device for providing synchronized look-up table loading.

Referring now to the drawings, FIG. 1 is a block diagram of an example printing device 100 for providing synchronized look-up table loading. Printing device 100 may be any device capable of printing that is accessible to a computing device. In the example of FIG. 1, printing device 100 includes memory controller 110, external memory 112, processor 114, processor memory 116, machine-readable storage medium 120.

Memory controller 110 may be any number of digital circuits and/or other hardware devices suitable for providing synchronized look-up table loading. Memory controller 110 may fetch, decode, and execute instructions to enable synchronized look-up table loading, as described below. As an alternative, or in addition, to retrieving and executing instructions, memory controller 114 may include any number of electronic circuits comprising a number of electronic components for performing the functionality of instructions 122 and/or 124. Memory controller 110 also has access to processor memory 116 so that memory controller 110 can load data from external memory 112 to processor memory 116. In contrast to processor 114, memory controller 110 is a dedicated component for managing the state of look-up tables in processor memory 116.

External memory 112 may be any electronic, magnetic, optical, or other physical storage device that stores data related to look-up tables. Thus, external memory 112 may be, for example, Random Access Memory (RAM), Read-Only Memory (ROM), Electrically-Erasable Programmable Read-Only Memory (EEPROM), flash memory, and the like. As described in detail below, external memory 112 may store look-up tables and related metadata. External memory 112 is typically less expensive and larger than processor memory 116 included in processor 114 described below.

Processor 114 may be any number of ASIC, FPGA, and/or other hardware devices suitable for processing print jobs of the printing device. Processor 114 may fetch, decode, and execute instructions to print portions (e.g., pages, regions of a large page, etc.) of a print job.

Processor memory 116 may be any electronic, magnetic, optical, or other physical storage device that stores data for use by processor 114. Thus, processor memory 116 may be, for example, Static Random Access Memory (SRAM) or some other memory suitable for use as a processor cache. Processor memory 116 is typicality integrated in processor 114 to, for example, improve memory access speed.

Machine-readable storage medium 120 may be any electronic, magnetic, optical, or other physical storage device that stores executable instructions. Thus, machine-readable storage medium 120 may be, for example, Random Access Memory (RAM), Read-Only Memory (ROM), Electrically-Erasable Programmable Read-Only Memory (EEPROM), flash memory, and the like. As described in detail below, machine-readable storage medium 120 may be encoded with executable instructions for providing synchronized look-up table loading.

Look-up data accessing instructions 122 obtain look-up data for synchronizing look-up table loading with a print job. Specifically, the look-up data may be look-up table metadata and synchronization data. In this example, look-up table metadata includes for each look-up table an address in external memory 112 where the look-up table is stored in external memory 112, a size of the look-up table in bytes, and an address in processor memory 116 where the look-up table should be loaded. Look-up data accessing instructions 122 may be triggered in response to an event such as processor 114 reaching a buffer trigger row in a print job.

Look-up table loading instructions 124 loads a look-up table into processor memory 116 according to the look-up data retrieved as described above. Typically, look-up table loading instructions loads the look-up into a buffer area of processor memory 116 that is to be used by processor 114 at a future time of the print job. In this manner, the processor 114 can continue to process the print job uninterrupted while memory controller 110 manages the look-up tables in processor memory 116.

Figure 2:
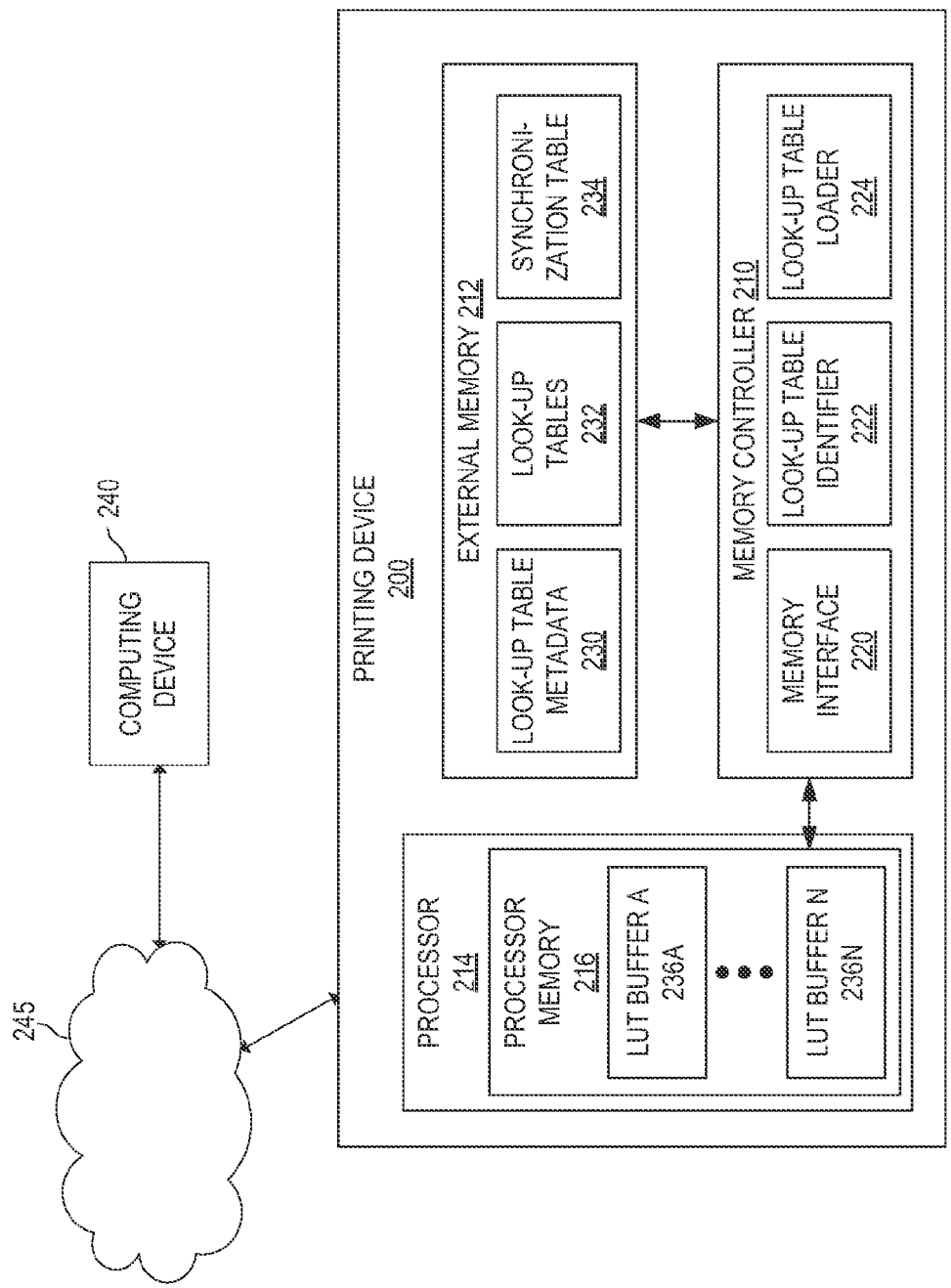
FIG. 2 is a block diagram of an example printing device in communication with an example printing device for providing synchronized look-up table loading.

FIG. 2 is a block diagram of an example printing device 200 in communication via a network 245 with an example computing device 240. As illustrated in FIG. 2 and described below, printing device 200 may communicate with computing device 240 to process a print job while performing synchronized look-up table loading.

As illustrated, printing device 200 may include memory control 210, external memory 212, and processor 214. Each of the modules of memory controller 210 may include a series of instructions encoded on a machine-readable storage medium and executable by memory controller 210. In addition or as an alternative, each module may include any number of hardware devices including electronic circuitry for implementing the functionality described below.

Printing device 200 may be an inkjet printer, a laser printer, a solid ink printer, or any other device suitable for executing the functionality described below. As detailed below, printing device 200 may include components for providing synchronized look-up table loading.

Memory controller 210 is configured to manage look-up tables stored in buffers of processor memory 216. Although the components of memory controller 210 are described in detail below, additional details regarding an example implementation of controller 210 are provided above with respect to instructions 122-124 of FIG. 1.

Memory interface 220 provides memory controller 210 with access to external memory 212 and processor memory 216. Specifically, the memory interface 220 may operatively connect memory controller 210 to memory 212, 216 and allow memory controller 210 to perform operations at memory addresses of memory 212, 216. For example, memory interface 220 can be used to access look-up table metadata 230 in external memory 212. In another example, memory interface 220 can be used to copy a look-up table 232 from external memory 212 to processor memory 216.

Look-up table identifier 222 obtains and analyzes look-up table data from external memory 212. Specifically, look-up table identifier 222 may access synchronization table 234 to determine the buffer trigger rows for a current portion of the print job that is being processed by printing device 200. In some cases, synchronization table 234 is loaded with the appropriate values for a portion of the print job (e.g., pages, regions of a large page, etc.) as the printing of the portion is initiated. A buffer trigger row identifies a row in the portion of the print job when a next look-up table to be used should be loaded into a next buffer in processor memory 216. After the buffer trigger rows are determined, the look-up table metadata 230 may be accessed to obtain data related to the next look-up table such as a memory address of the next look-up table 232 in external memory 212, a size of the next look-up table 232, and a destination address for the next look-up table 232 in processor memory 216.

Look-up table loader 224 dynamically loads look-up tables 232 into processor memory 216 based on the buffer trigger rows determined above. In response to printing device 200 reaching a buffer trigger row, look-up table loader 224 loads the corresponding look-up table 232 from external memory 212 to the next buffer (e.g., look-up table buffer A 236A, look-up table buffer N 236N). As the print job is processed, the progress is monitored and look-up tables 232 are loaded automatically by look-up table loader as specified in the synchronization table 234. Each entry in synchronization table 234 may include a reference to a look-up table, the buffer trigger row of the look-up table, and the target row of the look-up table. The target row of the look-up table is the row of the page where the look-up table should be used by processor 214 during the printing process.

Look-up table loader 224 may also initially load static look-up tables that are used by processor 214 throughout the printing of a portion of a print job. In this case, the buffer trigger row and the target row of the static look-up tables is designated as zero.

Processor 214 may be any number of ASIC, FPGA, and/or other hardware devices suitable for processing print jobs of the printing device. Processor memory 216 may be any electronic, magnetic, optical, or other physical storage device that stores data for use by processor 214 such as SRAM. Processor memory 216 includes a number of look-up table buffers 236A, 236N for storing look-up tables that are used to process the print jobs. While printing, processor 214 may designate a look-up table buffer (e.g., look-up table buffer A 236A) as the current buffer being used to print a portion of the print job and another look-up table (.e.g., look-up table buffer N 236N) as the next buffer to be used once a target row of the portion is reached. In this manner, processor 214 may continuously cycle through its look-up table buffers 236A, 236N, which are automatically loaded by memory controller 210.

In some cases, printing device 200 may exhibit variability in the size of the drops ejected during printing. In order to avoid defects on paper, the difference in drop size is measured and compensated for using the look-up tables 232 to lowers or increase the contone level depending on the drop size. In other cases, printhead nozzles (not shown) of printing device 200 may become incapable of firing ink drops. To recover from disabled printhead nozzles, printing device 200 may use other nozzles that fire the same colorants as the disabled nozzles. In this case, printing device 200 may use a look-up table to convert the print job from the initial color space to a color space using the colorants available in the printer. As described above, the look-up tables 232 loaded in processor memory 216 are continuously updated during the processing of the print job.

Some of the look-up table buffers 236A, 236N can be used as static buffers for storing static look-up tables. A static look-up table is used by the processor throughout the printing of a portion of the print job. In this case, the remaining look-up table buffers are used to dynamically load look-up tables during the print job.

External memory 232 may be any electronic, magnetic, optical, or other physical storage device such as Random Access Memory (RAM), Read-Only Memory (ROM), Electrically-Erasable Programmable Read-Only Memory (EEPROM), flash memory, etc. External memory 232 includes look-up table metadata 230, look-up tables 232, and synchronization table 234.

Figure 3:
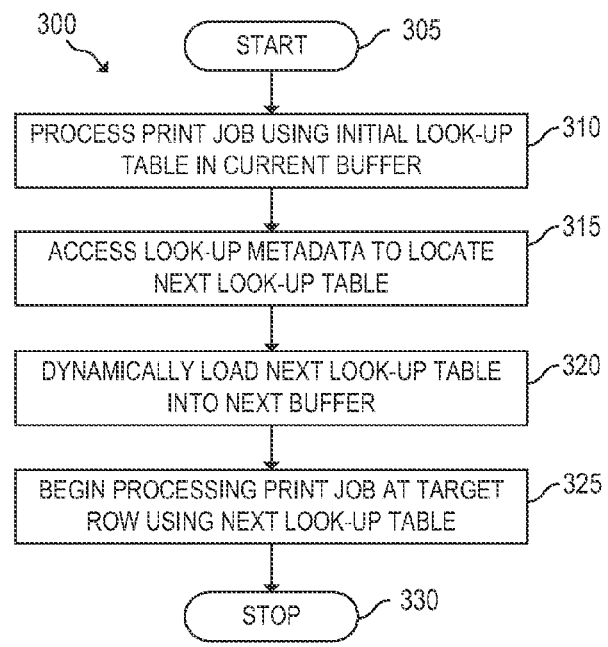
FIG. 3 is a flowchart of an example method for execution by a printing device for providing synchronized look-up table loading.

FIG. 3 is a flowchart of an example method 300 for execution by in dog device 100 for providing synchronized look-up table loading. Although execution of method 300 is described below with reference to printing device 100 of FIG. 1, other suitable devices for execution of method 300 may be used, such as printing device 200 of FIG. 2. Method 300 may be implemented in the form of executable instructions stored on a machine-readable storage medium, such as storage medium 120, and/or in the form of electronic circuitry.

Method 300 may start in block 305 and continue to block 310, where printing device 100 processes a print job using an initial look-up table in a current buffer of processor memory. The initial look-up table can be used to print a range of rows in a portion (e.g., pages, regions of a large page, etc.) of the print job. The print job is processed by a processor of printing device 100. In block 315, look-up table metadata is access to locate the next look-up table. Specifically, in response to a buffer trigger row of the portion being reached during the print job, look-up table metadata is accessed. The buffer trigger row is specified in a synchronization table.

In block 320, the next look-up table is dynamically loaded into the next buffer. The look-up table metadata is accessed and then used to load the next look-up table into the next buffer by a memory controller of printing device 100. In block 325, the processor of printing device 325 begins to process the portion of the print job at a target row using the next look-up table. Method 300 may then continue to block 330, where method 300 may stop.

Figure 4:
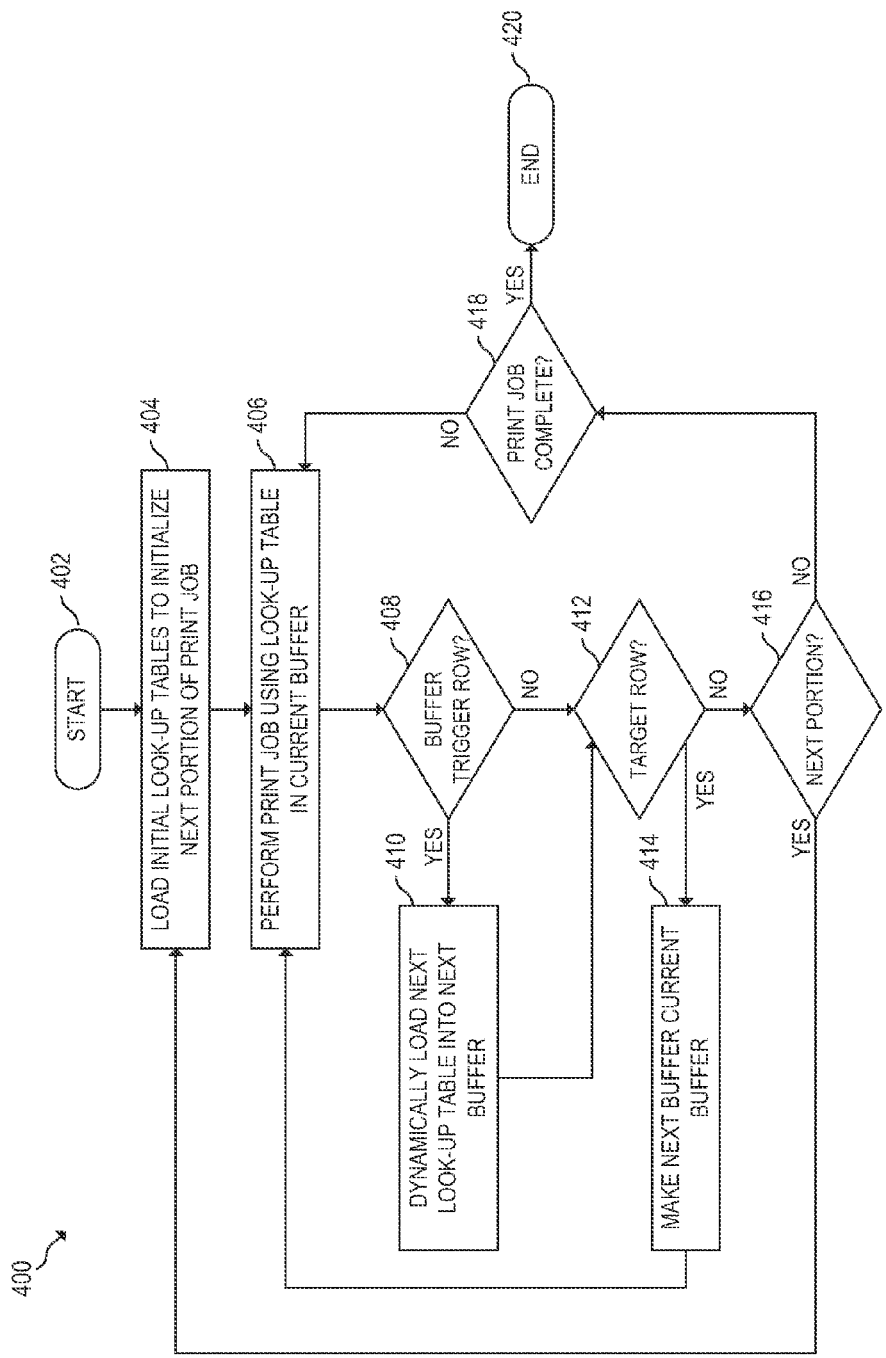
FIG. 4 is a flowchart of an example method for execution by a printing device for loading look-up tables during a print job.

FIG. 4 is a flowchart of an example method 400 for execution by printing device 200 for loading look-up tables during a print job. Although execution of method 400 is described below with reference to printing device 200 of FIG. 2, other suitable devices for execution of method 400 may be used. Method 400 may be implemented in the form of executable instructions stored on a machine-readable storage medium and/or in the form of electronic circuitry.

Method 400 may start in block 402 and proceed to block 404, where printing device 200 loads the initial look-up tables to initialize the next portion of a print job. Each portion of the print job may use a different set of look-up tables to account for printing variances such as drop size, cross color replacement, etc. Further, the look-up table buffers of printing device 200 may be loaded with the initial look-up tables for the next portion. In some cases, some number of static look-up tables are loaded that are used throughout the print job, where the look-up tables described below are dynamically loaded to account for printing variances. In block 406, the print job is performed using the look-up table in the current buffer.

In block 408, printing device 200 determines if the print job has reached a buffer trigger row of the current portion of the print job. If a buffer trigger row is reached, the next look-up table is dynamically loaded into the next buffer of printing device 200 in block 410. The next look-up table is loaded by a memory controller of printing device 200 in parallel so that a processor of printing device 200 can continue processing the print job.

In block 412, printing device 200 determines if the print job has reached a target row of the current portion of the print job. If the target row is reached, printing device 200 makes the next buffer the current buffer in block 414. At this stage, method 400 returns to block 406 so that the next look-up table that is now in the current buffer can be used to continue the processing of the print job. If the target row is not reached, printing device 200 determines if the print job has reached the next portion in block 416.

If the next portion of the print job is reached, method 400 returns to block 404 so that the initial look-up tables of the next portion can be initialized. If the next portion of the print job is not reached, printing device 200 determines if the print job is complete in block 418. If the print job is not complete, method 400 returns to 406. If the print job is complete, method 400 may then continue to block 420, where method 400 may stop.

The foregoing disclosure describes a number of examples for providing synchronized look-up table loading of a printing device. In this manner, the examples disclosed herein enable synchronized look-up table loading by using a memory controller to dynamically load look-up tables, which are used by a processor to process a print job.

We claim:

1. A printing device for providing synchronized look-up table loading, the printing device comprising:
   a processor to process a print job that is received from a computing device;
   processor memory operatively connected to the processor and comprising a current buffer and a next buffer;
   external memory configured to store a plurality of look-up tables for processing the print job; and
   a memory controller operatively connected to the external memory, the memory controller to:
      in response to the processing of the print job reaching a buffer trigger row of a portion of the print job, accessing look-up metadata to locate a next look-up table of the plurality of look-up tables, wherein the processing of the print job is performed using an initial look-up table of the plurality of look-up tables that are stored in the current buffer; and
      dynamically load the next look-up table into the next buffer as the processor continues to process the print job, wherein the processing of the print job begins using the next look-up table after a target row of the portion of the print job is reached,
   wherein the look-up metadata comprises an external memory address, a look-up table size, and a processor memory address for each look-up table of the plurality of look-up tables, wherein the processor memory address is a destination in the processor memory for loading the look-up table.

2. The printing device of claim 1, wherein the next look-up table is used to compensate for variable drop size of a plurality of printheads while processing the print job.

3. The printing device of claim 1, wherein the next look-up table is used to convert the print job to a color space that uses colorants available to the printing device.

4. The printing device of claim 1, wherein the memory controller is further to load a static look-up table in a static buffer of the processor memory, wherein the processor uses the static look-up table throughout the processing of the portion of the print job.

5. A method for providing synchronized look-up table loading, the method comprising:
   using an initial look-up table of a plurality of look-up tables to process a print job, wherein the initial look-up table is loaded in a current buffer of processor memory;
   in response to reaching a buffer trigger row of a portion of the print job, accessing look-up metadata to locate a next look-up table of the plurality of look-up tables;
   dynamically loading the next look-up table a next buffer of the processor memory as processing of the print job continues;
   using the next look-up table to process the print job after a target row of the portion of the print job is reached; and
   loading a static look-up table in a static buffer of the processor memory, wherein the processor uses the static look-up table throughout the processing of the portion of the print job.

6. The method of claim 5, wherein the initial look-up and the next look-up table are initially stored in external memory before being loaded into the processor memory by a memory controller.

7. The method of claim 5, wherein the next look-up table is used to compensate for variable drop size of a plurality of printheads while processing the print job.

8. The method of claim 5, wherein the next look-up table is used to convert the print job to a color space that uses available colorants.

9. A non-transitory machine-readable storage medium encoded with instructions executable by a processor for providing synchronized look-up table loading, the machine-readable storage medium comprising instructions to:

load an initial look-up table of a plurality of look-up tables to a current buffer of processor memory, wherein the initial look-up table is used to process a print job;

in response to reaching a buffer trigger row of a portion of the print job, access look-up metadata to locate a next look-up table of the plurality of look-up tables;

dynamically load the next look-up table a next buffer of the processor memory as processing of the print job continues, wherein the next look-up table is used to process the print job after a target row of the portion of the print job is reached, wherein the next look-up table is used to convert the print job to a color space that uses available colorants.

10. The non-transitory machine-readable storage medium of claim 9, wherein the initial look-up and the next look-up table are initially stored in external memory before being loaded into the processor memory by a memory controller.

11. The non-transitory machine-readable storage medium of claim 9, wherein the next look-up table is used to compensate for variable drop size of a plurality of printheads while processing the print job.

12. The non-transitory machine-readable storage medium of claim 9, further comprising instructions to load a static look-up table in a static buffer of the processor memory, wherein the processor uses the static look-up table throughout the processing of the portion of the print job.

* * * * *